United States Patent
Verbestel

[15] 3,699,202
[45] Oct. 17, 1972

[54] MANUFACTURE OF PRESSED BOARDS
[72] Inventor: Jean-Baptiste Verbestel, Van Maerlantstraat, Kortryk, Belgium
[22] Filed: Aug. 3, 1970
[21] Appl. No.: 60,515

Related U.S. Application Data
[63] Continuation-in-part of Ser. No. 806,217, March 11, 1969, abandoned.

[30] Foreign Application Priority Data
March 19, 1968 Belgium..........................56 030

[52] U.S. Cl...............264/109, 264/83, 264/DIG. 51
[51] Int. Cl. ..............................................B29j 5/02
[58] Field of Search....264/109, 112, 37, 82, 88, 121, 264/DIG. 83

[56] References Cited

UNITED STATES PATENTS 3,442,999 5/1969 Konig et al. ...............264/109
3,001,228 9/1961 Nack ...................264/DIG. 51

Primary Examiner—Robert F. White
Assistant Examiner—J. R. Hall
Attorney—Kurt Kelman

[57] ABSTRACT

Gaseous reactive or polymerizable compounds and a gaseous catalyst are incorporated into lignocellulosic particles or fibers, and the compounds are reacted or polymerized in the presence of the catalyst to form a binder during hot pressing of the particles or fibers to form a board.

7 Claims, 4 Drawing Figures

INVENTOR
JEAN-BAPTISTE VERBESTEL

BY Kurt Kelman
AGENT

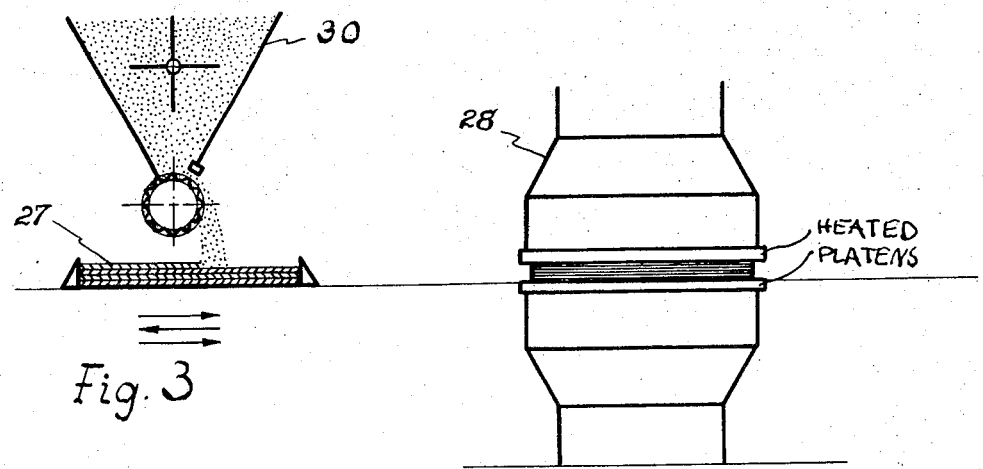

MANUFACTURE OF PRESSED BOARDS

This is a continuation-in-part of my copending application Ser. No. 806,217, filed Mar. 11, 1969 now abandoned.

The present invention relates to the manufacture of pressed boards from lignocellulosic particles or fibers by hot pressing.

The manufacture of pressed fiberboard has been known for a long time and, in all known industrial processes, the lignocellulosic material is first fibrillated by subjecting the wood to pressure cooking and mechanical fibrillation in an aqueous medium. This pre-treatment is necessary so that the fibers may be felted and agglomerated by pressure, possibly in the presence of a binder. However, the huge amount of water that must be drained from the particulate lignocellulosic material during the manufacture of the boards also washes away a considerable amount of natural compounds which function as binders. Added artificial binders, such as blood albumin of phenolic resins, at least partially follow the same path and are found in the waste water.

In this conventional wet process, another important quantity of water must be eliminated by pressing and evaporation, thus leading to a high consumption of calories and imposing long pressing cycles, all of which increases the cost of the manufacturing process considerably. Furthermore, the thickness of pressed boards manufactured in this manner is limited to about 4 mm.

If the fibers are dried before pressing, the problems connected with the wet fibrillation pre-treatment still remain and, furthermore, additional quantities of binder are needed.

It is the primary object of the present invention to overcome the above disadvantages and to provide an economical and effective manufacturing process for making high-quality pressed boards from particulate lignocellulosic material.

The above and other objects are accomplished in accordance with this invention by incorporating monomers capable of reacting in the presence of a catalyst and heat to form a resinous binder, and the catalyst into the lignocellulosic particles or fibers while at least one of the monomers or the catalyst are in the gaseous state, and forming the binder during the subsequent hot pressing of the particles or fibers. At least some of the monomeric compounds may also react with natural constituents of the lignocellulosic material. The resultant binder will assure a most satisfactory agglomeration of the particles or fibers to produce a strong pressed board.

According to a preferred embodiment, the fibers or particles are suspended in a current of an inert gas, such as air, and the gaseous compounds and catalyst are introduced therein for incorporation into the particles or fibers. For this purpose, the particulate lignocellulosic material must be in a degree of fineness enabling it to be suspended in an inert gas stream.

Particulate lignocellulosic material used for making pressed boards usually has length of 2 to 25 mm, a width of 0.5 to 25 mm, and a thickness of 0.05 to 0.5 mm, when in particle form, and about the same length and a diameter up to about 0.2 to 0.3 mm, when in fiber form. Preferably, the length will not exceed about 5 mm, the width will not exceed about 1 mm, and the thickness or diameter will not exceed about 0.2 mm.

If the current speed is between 18 and 28 cm/sec, the particle size must be below 0.2 mm; with a current speed of 25 to 45 cm/sec, the particle size must be between 0.3 and 0.5 mm; and particles of a size between 0.5 and 0.6 mm will remain suspended in an air current having a speed of 30 to 55 cm/sec. It will obviously always be possible to regulate the inert gas current speed independent of the particle or fiber size so as to maintain the particulate lignocellulosic material in suspension in a free flowing, fluidized bed.

The binder constituents may be selected from the following compounds, for instance, which have reactive groups capable of undergoing a condensation reaction:

1. Phenolic compounds which react with aldehydes or ketones and sometimes also with the lignocellulosic material itself. Such compounds may be vaporized to the gaseous state by a suitable increase in temperature, and include phenol, o-, m- and p-cresol, resorcinol, xylenols, thio-phenols, etc.
2. Aldehydes and ketones obtainable in gaseous or vapor state and reactive with a phenolic compound, such as formaldehyde, furfural, acetaldehyde, acetone, methyl ethyl ketone, etc.

As catalysts for the above compounds may be used ammonia, methyl amine, ethyl amine, pyridine, morpholine, and other strong amines.

The use of phenol, formaldehyde and ammonia as catalyst is preferred, primarily for economic reasons, and also because phenol and ammonia are known plasticizers for lignocellulosic materials.

It is also possible to use such polymerizable or copolymerizable binder constituents as styrene, methyl styrene or vinyl toluene.

The above and other objects, advantages and features of the present invention will become better understood in the following detailed description of certain preferred embodiments, taken in conjunction with the accompanying drawing illustrating an apparatus capable of carrying out the process of this invention.

In the drawing,

FIG. 1 schematically illustrates an installation according to the invention;

FIG. 3 illustrates a generally conventional board forming station; and

FIG. 4 shows a conventional laminating press.

Figure 1:
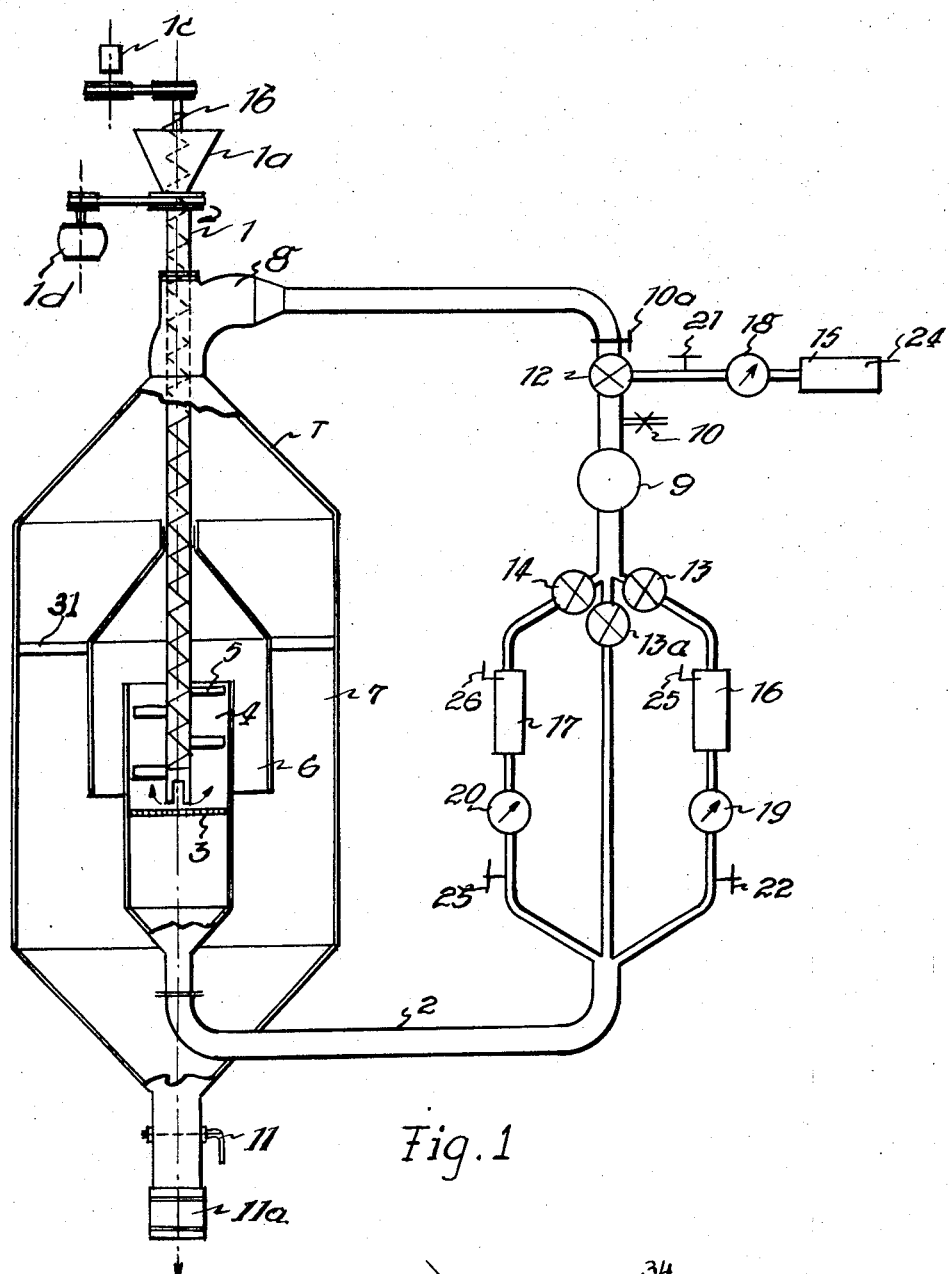

The illustrated apparatus includes an upright tank T having an inlet 1a and an outlet 11a. A supply pipe 1 houses a rotating screw conveyor 1b driven by motor 1c and extends into the tank through inlet hopper 1a for delivering a metered and continuous flow of particulate lignocellulosic material into chamber 4 defined by an innermost cylinder which is open at the top and whose funnel-shaped bottom opens into pipe 2. In a manner to be described fully hereinafter, an inert gas, preferably air, and the gaseous, binder-forming reactants are introduced through pipe 2. A screen 3 partitions the interior of the innermost cylinder. The supply pipe 1 opens into chamber 4 above screen 3 so that the particulate lignocellulosic material is carried upwardly by the gas current emanating from pipe 2 and is evenly distributed in chamber 4 above screen 3. A rotating agitator 5 consisting of a plurality of blades fixed on pipe 1 is driven by motor 1d which rotates the pipe and agitator in the opposite direction to the screw conveyor 1b, thus maintaining a fluidized bed of the material in admixture with the gaseous reactants above screen 3.

In the illustrated embodiment, the innermost cylinder defining chamber 4 is mounted coaxially in tank T and another cylinder defining an expansion chamber 6 is mounted concentrically about the innermost cylinder, the open top of the innermost cylinder being in communication with the expansion chamber 6. The closed top of the other cylinder is fixed to the walls of the tank T by radial brackets 31 and its bottom is open.

The agitator 5 keeps the fluidized bed of lignocellulosic material in a well homogenized, continuous flow, and the upwardly moving air current moves the bed over the open top of the innermost cylinder whence it falls downward through chamber 6 to facilitate the separation of the particulate material from the air. The lignocellulosic material is discharged downwardly by gravity and flows through the funnel-shaped bottom of tank T into outlet 11a where an airlock 11 is provided, which prevents escape of any gaseous medium. The air, which may carry some of the particulate material, will be further separated from this material in the outer expansion chamber 7, which concentrically surrounds chambers 4 and 6, and is recovered through pipe 8.

It will be understood that a horizontal apparatus with a fluidized or turbulent bed could also be used, and/or the successive treatment chambers need not be centered or concentric.

The recuperated air is recycled from pipe 8 by ventilator 9 and additional air is supplied to pipe 2 through valve 10 to compensate for any losses of gaseous medium at air lock 11 which is so regulated that a continuous flow of particulate lignocellulosic material passes through the lock without significant losses of gas. A damper 10a further regulates the air flow from pipe 8.

The gaseous reactive compounds capable of forming a binder are introduced through valves 12, 13 and 14, or valve 13a when valves 13 and 14 are closed, combined with the vaporizing systems 15, 16 and 17. The vaporizing rate of the reactants is determined by regulating the temperature of the vaporizing systems, and the amounts of the reactants are determined by the air flow through the vaporizing systems. Flowmeters 18, 19 and 20 control the total quantity of the fluid and the flow at any given time. Sampling valves 21, 22 and 23 are arranged at the outlets of the flowmeters to control the concentration of the reactant compounds in the gaseous stream.

The vaporizing systems also include automatic level controls 24, 25 and 26 for the reactants.

The above-described and illustrated supply unit is based on the use of two reactive compounds and a catalyst. To avoid any condensation of the gaseous compounds and catalyst on the metallic walls of the apparatus, the pipe 2 and the funnel-shaped bottom of chamber 4 are heated.

The temperature of the fluidized bed of the particulate lignocellulosic material will depend on the gaseous reactants used. With phenolic, aldehyde or ketone compounds, the temperature will preferably be held in the range of about 40° C to 80° C. With ammonia or amine compounds, the temperature will preferably be in the range of about 10° C to 30° C.

The quantity of phenolic compounds may vary from about 1 to 5 percent, based on the weight of the lignocellulosic material, preferably 2 to 3 percent. The quantity of aldehyde or ketone may vary from 1 to 5 percent, based on the weight of the lignocellulosic material, preferably 2.5 to 3 percent. The quantity of the catalyst may vary from 0.2 to 2.5 percent, based on the weight of the lignocellulosic material, preferably 0.4 to 1 percent.

Figure 2:
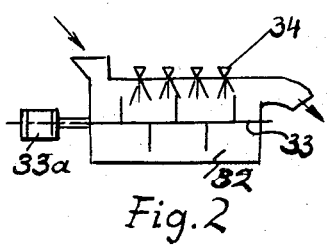
FIG. 2 shows an optionally used mixer.

If one of the binder constituents is applied in liquid form, the material from the outlet 11a is fed to a conventional mixer 32 with spraying equipment, as shown schematically in FIG. 2. The mixer consists of a hollow cylinder with a coaxially mounted agitator 33 driven by motor 33a and spray nozzles 34 on top of the cylinder for supplying the liquid binder constituent. From the mixer the material is fed into a hopper at the forming station 30 (FIG. 3), followed by the press 28 (FIG. 4).

When all binder constituents are in gaseous form, the material is delivered from outlet 11a directly to the forming station 30.

The forming station and the press are entirely conventional and are, therefore, shown only schematically to depict the formation of the pressed boards.

The following specific examples were carried out in the described apparatus and will further illustrate the process of the present invention without in any way limiting it thereto.

EXAMPLE 1

30 kilograms of fine bagasse material passing through a screen of 0.5 mm openings and containing 30 to 35 percent pith, with a moisture content of 3 percent, based on the dry material, was fed from a conventional metering hopper 1a through pipe 1 at a rate of about 700 g per minute. The dwell time of the material in the fluidized bed was about three to 5 minutes.

With valve 13 open, three-way valve 12 open to connect pipe 8 to ventilator 9 but closing off evaporator 15, and valves 13a and 14 closed, ventilator 9 was started and phenol in vaporizing device 16 was heated to a temperature of about 105° C so that the concentration of gaseous phenol in the air stream produced by the ventilator amounted to 10 mg/l. The linear air speed of the current emerging from pipe 2 and passing through chamber 4 was about 0.5 m/sec., and phenol was supplied until the bagasse particles adsorbed up to 2–2.5 percent, by weight, of phenol in the fluidized bed. The feed pipe 2 and the funnel-shaped bottom of tank T were heated to 60° C. Treated material was intermittently discharged through air lock 11 into a conventional metering hopper 1a.

After the phenol adsorption was completed, the phenol-impregnated material was fed from the metering bin through pipe 1, valve 13 was closed and valves 12 and 13a were opened to supply gaseous ammonia as the catalyst to the fluidized bagasse bed in chamber 4 from vaporizing device 15, the apparatus first having been cooled. The ammonia supply was continued until the bagasse had adsorbed about 0.5–1 percent, by weight of the dry material, of the catalyst. The concentration of the gaseous ammonia in the air stream was about 5 mg/l. Again, the treated material was intermittently discharged through air lock 11 into a conventional metering hopper 1a.

Finally, the material carrying phenol and ammonia was again fed from the metering hopper 1a into the tank and valves 12 and 13a were closed, i.e., three-way valve 12 was moved to shut off evaporator 15 but connect pipe 8 with ventilator 9, while valve 14 was opened to supply gaseous formaldehyde from vaporizing device 17 to the fluidized bed of bagasse; the concentration of formaldehyde in the air stream being about 5 mg/l. Formaldehyde was supplied until the bagasse had adsorbed 1–1.5 percent, by weight on the dry material.

The thus impregnated or treated particulate bagasse was again intermittently discharged through outlet 11a by opening air lock 11 at predetermined intervals. Treated material is intermittently discharged to preserve fluidized pressure in the system. Otherwise, air lock 11 would have to remain open for continuous discharge in which case fluidized pressure would be lost.

The treated material was then collected and fed to a forming machine 30 which formed a uniform mat 27. This mat was pressed into a board of $1\ m \times 1\ m$ by subjecting it to a specific pressure of 40 kg/cm² for a period of 2 minutes at a temperature of 212° C in press 28. The pressure was gradually reduced to facilitate the escape of vapors formed. The total pressing time was 6 minutes 30 seconds, and the resultant board had the following properties:

| | |
|---|---|
| density: in kg/m³ | 1080 |
| thickness: in mm | 3.9 |
| bending strength: in kg/cm² | 290 |
| modulus of elasticity: in kg/cm² | 38,100 |
| swelling after 2 h. immersion at 20°C: % | 5.6 |

Working in the same manner but first applying the formaldehyde, followed by the ammonia and then phenol, a pressed board of the following properties was obtained:

| | |
|---|---|
| density: in kg/m³ | 1058 |
| thickness: in mm | 3.9 |
| bending strength: in kg/cm² | 315 |
| modulus of elasticity: in kg/cm² | 41,000 |
| swelling after 2 h. immersion at 20°C: % | 4 |

EXAMPLE 2

Birch wood flakes were passed through a wing beater mill provided with a 2 mm screen, and the obtained material was screened on a 1 mm sieve, with the oversized particles being rejected.

The classified birch wood particles were then sprayed with a paraffin emulsion to obtain 2 percent solid paraffin on the particles. The material was dried to a moisture content of 3 percent and fed through pipe 1 at a speed of 700 g/min. The material was then treated as in Example 1 except with ammonia, formaldehyde and phenol, in that order, the ammonia being carried through the fluidized bed at a speed of about 0.5 m/sec. The adsorbed quantity of ammonia was about 0.7 percent, by weight. Pipe 2 and the bottom of tank T were then warmed to 60° C and formaldehyde was delivered to the fluidized bed at the same speed, with the particles adsorbing about 1 percent of formaldehyde, by weight. Similarly, about 2 percent of phenol was adsorbed.

Pressed boards of $1\ m \times 1\ m$ size were produced by subjecting the thus treated particles to a pressure of 72 kg/cm² at a temperature of 215° C for a total pressure cycle of 5 minutes 30 seconds. The resultant boards had the following properties:

| | |
|---|---|
| density: in kg/m³ | 1142 |
| thickness: in mm | 3.9 |
| bending strength: in kg/cm² | 465 |
| modulus of elasticity: in kg/cm² | 59,630 |
| perpendicular strength: in kg/cm² | 10.5 |
| swelling after 2 h. immersion at 20°C: % | 3.7 |

EXAMPLE 3

A mixture of resinous wood sawdust (pine and fir) was dried to a moisture content of 3 percent and passed through a wing beater mill provided with a 1.5 mm screen. The material was then passed through a pneumatic classifier and the heavy particles were recycled through the mill and added to the light fraction. The thus obtained particulate material was then fed through pipe 1 in the same manner as in Example 2 but sufficient phenol was fed to the bed to increase the phenol amount to 2.5 percent, by weight.

The thus treated sawdust was discharged through air lock 11 and fed to the conventional mixer 32 wherein it was sprayed with an aqueous solution of formaldehyde (34 g/100 g solution) so as to impregnate the particles with 3 percent by weight on the material, of formaldehyde. Thereafter, the particles were collected in a conventional metering hopper 1a and were again fed through pipe 1 into tank T to adsorb 0.3 percent of ammonia supplied in the same manner as in Example 2.

The particles were then pressed in the same manner as in Example 2, producing boards of the following properties:

| | |
|---|---|
| density: in kg/m³ | 1182 |
| thickness: in mm | 5.5 |
| bending strength: in kg/cm² | 726 |
| modulus of elasticity: in kg/cm² | 82,560 |
| perpendicular strength: in kg/cm² | 16.8 |
| swelling after 2 h. immersion at 20°C: % | 3.2 |

From the above examples it is clear that the compounds react in the presence of the catalyst to form a binder during the hot pressing of the boards. While all binder constituents may be supplied in the gaseous state, it is also possible to apply either one of the binder constituents or the catalyst in a dilute aqueous solution. The sequence of applying the gaseous and/or liquid components may be varied. Under some circumstances, it may also be possible to apply two constituents simultaneously.

The advantages of the described process include the following:

1. The disintegration and/or fibrillation of the raw material is effected in a dry or almost dry state of the material so that no water need be eliminated and there is no waste of natural binders being washed away from the lignocellulosic material, which binders contribute importantly to the agglomeration of the particles in forming the boards.

As a result, such fine materials as sawdust, waste fibers or fibrils of annual plants and vegetal particles containing pith cells, for example sugar cane bagasse, may be used in the present process with good results.

2. The binder constituents are fixed on the lignocellulosic material without loss.

3. The shelf stability of binder resins are of no importance since the constituent reactants are stored separately as monomers.

4. Since wet fibrillation and wet forming and pressing are eliminated, the equipment may be simplified.

5. Elimination of cooking, wet fibrillation, and wet forming produce high calorific economy. In the process of the present invention, all operations are effected at maximum moisture contents of the lignocellulosic material of 15 percent, preferably less than 10 percent, based on the dry material.

6. The supply of huge quantities of water and the treatment of waste water are eliminated completely.

7. The duration of the pressing cycle is reduced because of the low moisture content of the particles. This controlled moisture content also allows the production of pressed boards of increased thickness.

What is claimed is:

1. A process for manufacturing a board from particulate lignocellulosic material which comprises:
   a. suspending lignocellulosic material in a current of inert gas, the degree of fineness of the lignocellulosic material and the gas current speed being correlated to form a fluidized bed of the lignocellulosic material;
   b. incorporating into the particulate lignocellulosic material in successive and separate stages three gaseous compounds including two monomeric constituents of a resinous binder and a catalyst;
      i. said incorporating of each gaseous compound being by means of the current of inert gas in one of the successive and separate stages;
      ii. the lignocellulosic material being removed from the fluidized bed after each of the successive stages and being recycled to form successive and separate fluidized beds for incorporation of each of the gaseous compounds; and
   c. forming a binder of said compounds incorporated into the particulate lignocellulosic material during hot pressing of the lignocellulosic material into a board.

2. The process of claim 1 wherein the binder constituents have a reactive group capable of a condensation reaction in the presence of the catalyst.

3. The process of claim 1 wherein the binder constituents are phenol and formaldehyde, and the catalyst is ammonia.

4. A process for manufacturing a board from particulate lignocellulosic material which comprises:
   a. suspending lignocellulosic material in a current of inert gas, the degree of fineness of the lignocellulosic material and the gas current speed being correlated to form a fluidized bed of the lignocellulosic material;
   b. incorporating a gaseous monomeric constituent of a resinous binder into the particulate lignocellulosic material by means of the current of inert gas;
   c. removing the particulate material from the fluidized bed of Step (b);
   d. incorporating a liquid monomeric constituent of a resinous binder into the particulate material of Step (c) by spraying;
   e. suspending the particulate material from Step (d) in a current of inert gas, the gas current speed being correlated to form a fluidized bed of the said particulate material;
   f. incorporating a gaseous catalyst into the particulate material of Step (e);
   g. removing the particulate material from the fluidized bed of Step (f); and
   h. forming a binder of said materials incorporated into the particulate lignocellulosic material during hot pressing of the lignocellulosic material into a board.

5. The process of claim 4 wherein the binder constituents have a reactive group capable of a condensation reaction in the presence of the catalyst.

6. The process of claim 4 wherein the binder constituents are phenol and formaldehyde, and the catalyst is ammonia.

7. The process of claim 6 wherein the phenol is applied in the gaseous state, the formaldehyde is applied in a liquid state, and the ammonia is applied in a gaseous state.

* * * * *